United States Patent
Gutacker et al.

(10) Patent No.: US 12,163,043 B2
(45) Date of Patent: Dec. 10, 2024

(54) CURABLE COMPOSITION COMPRISING POLYSILOXANE POLYALKYLENEGLYCOL BRUSH COPOLYMERS

(71) Applicant: Henkel AG & Co. KGaA, Duesseldorf (DE)

(72) Inventors: Andrea Gutacker, Langenfeld (DE); Johann Klein, Duesseldorf (DE); Annika Dietrich, Rostock (DE); Esteban Mejia, Rostock (DE); Therese Hemery, Wiesbaden (DE)

(73) Assignee: Henkel AG & Co. KGaA, Duesseldorf (DE)

(*) Notice: Subject to any disclaimer, the term of this patent is extended or adjusted under 35 U.S.C. 154(b) by 72 days.

(21) Appl. No.: 17/338,176

(22) Filed: Jun. 3, 2021

(65) Prior Publication Data

US 2021/0292484 A1 Sep. 23, 2021

Related U.S. Application Data

(63) Continuation of application No. PCT/EP2019/081900, filed on Nov. 20, 2019.

(30) Foreign Application Priority Data

Dec. 6, 2018 (EP) .................................. 18210647

(51) Int. Cl.
| | |
|---|---|
| *C09D 171/02* | (2006.01) |
| *C08G 65/04* | (2006.01) |
| *C08G 65/336* | (2006.01) |
| *C08G 77/08* | (2006.01) |
| *C08G 77/18* | (2006.01) |
| *C08G 77/26* | (2006.01) |
| *C08G 77/46* | (2006.01) |
| *C09D 183/12* | (2006.01) |
| *C09J 171/02* | (2006.01) |
| *C09J 183/12* | (2006.01) |

(52) U.S. Cl.
CPC .......... *C09D 171/02* (2013.01); *C08G 65/04* (2013.01); *C08G 65/336* (2013.01); *C08G 77/08* (2013.01); *C08G 77/18* (2013.01); *C08G 77/26* (2013.01); *C09D 183/12* (2013.01); *C09J 171/02* (2013.01); *C09J 183/12* (2013.01); *C08G 2150/00* (2013.01); *C08G 2170/00* (2013.01); *C08G 2190/00* (2013.01)

(58) Field of Classification Search
CPC ..................................................... C08L 43/04
See application file for complete search history.

(56) References Cited

U.S. PATENT DOCUMENTS

| | | | |
|---|---|---|---|
| 3,268,561 A | 8/1966 | Peppel et al. | |
| 3,723,491 A | 3/1973 | Rossmy et al. | |
| 4,618,703 A | 10/1986 | Thanawalla et al. | |
| 5,208,311 A * | 5/1993 | Schaefer | C08G 77/46 528/29 |
| 5,391,679 A * | 2/1995 | Burkhart | C08G 77/38 528/14 |
| 5,536,883 A | 7/1996 | Le-Khac | |
| 5,663,269 A | 9/1997 | Chu et al. | |
| 5,767,323 A | 6/1998 | Televantos et al. | |
| 6,162,888 A | 12/2000 | Lee et al. | |
| 9,073,836 B2 | 7/2015 | Klumpe et al. | |
| 9,283,164 B2 | 3/2016 | Furukawa et al. | |
| 9,458,286 B2 | 10/2016 | Zander et al. | |
| 10,273,335 B2 | 4/2019 | Helpenstein et al. | |
| 2003/0069389 A1 | 4/2003 | Eleveld et al. | |
| 2003/0158449 A1 | 8/2003 | Hofmann et al. | |
| 2004/0050297 A1 | 3/2004 | Kobayashi et al. | |
| 2004/0220430 A1 | 11/2004 | Eleveld et al. | |
| 2005/0065383 A1 | 3/2005 | Wehmeyer | |
| 2008/0167502 A1 | 7/2008 | Bohres et al. | |
| 2008/0171829 A1 | 7/2008 | Haider et al. | |
| 2011/0294933 A1 | 12/2011 | Jaunky et al. | |
| 2011/0301254 A1 | 12/2011 | Knott et al. | |
| 2014/0221549 A1 | 8/2014 | Webster et al. | |

FOREIGN PATENT DOCUMENTS

| | | |
|---|---|---|
| CN | 103665385 A | 3/2014 |
| DE | 102014212291 A1 | 12/2015 |
| EP | 0312265 A2 | 4/1989 |
| EP | 0894108 B1 | 7/2001 |
| JP | 2000327785 A | 11/2000 |
| JP | 2006-299132 A * | 11/2006 |
| JP | 2007056052 A | 3/2007 |
| JP | 2011231073 A | 11/2011 |
| WO | 2010074297 A1 | 7/2010 |
| WO | 2012136657 A1 | 10/2012 |

OTHER PUBLICATIONS

Machine translation of JP 2006-299132 A (no date).*
Abstract for CN 102209744 (Oct. 5, 2011).*
International Search Report for International PCT Patent Application No. PCT/EP2019/081898 dated Jan. 20, 2020.
International Search Report for International PCT Patent Application No. PCT/EP2019/081900 dated Jan. 20, 2020.

* cited by examiner

*Primary Examiner* — Marc S Zimmer
(74) *Attorney, Agent, or Firm* — Mary K. Cameron

(57) ABSTRACT

The invention relates to a curable composition comprising: a) at least one polymer having at least one silicon-containing group of formula $-Si(R^1)_k(Y)_{3-k}$ as defined herein, and b) at least one hydroxyl-functionalized polysiloxane polyalkyleneglycol brush copolymer of the structure $[A(-X-B)]_s$ as defined herein; and an adhesive, sealant, or coating material comprising said curable composition and use thereof.

18 Claims, No Drawings

CURABLE COMPOSITION COMPRISING POLYSILOXANE POLYALKYLENEGLYCOL BRUSH COPOLYMERS

The present invention relates to curable composition comprising at least one silicon-containing polymer and at least one polysiloxane polyalkyleneglycol brush copolymer as an additive. The invention relates furthermore to an adhesive, sealant, or coating material comprising said curable composition and the use thereof.

Polymer systems which possess reactive crosslinkable silyl groups, for example alkoxysilyl groups, have long been known. In the presence of atmospheric moisture these alkoxysilane-modified polymers are able to condense with elimination of the alkoxy groups. Depending on the amount of alkoxysilane groups and their structure, mainly long-chain polymers (thermoplastics), relatively wide-meshed three-dimensional networks (elastomers) or highly crosslinked systems (thermosets) form.

Silicone polymers, in particular polymethylsiloxanes such as polydimethylsiloxane (PDMS), are of great importance in adhesives, sealants, coatings, and insulating materials. Among these materials, those which vulcanize at low temperatures and under ambient conditions constitute a considerable market share. Typical formulations contain a reactive PDMS polymer, a crosslinker, and a condensation catalyst.

There is a need for polymer systems based on silicon-containing polymers which can modify surface energies in adhesive, coating and sealant applications. The modification of surfaces in wet environments (such as bathrooms, kitchens, air conditioning systems or tropical areas in general) results in an improvement against surface moisture. The herein disclosed silicon-containing polymers can prevent moisture accumulation, as well as bacterial fouling, which leads in a better long-term stability of the surfaces.

It has been known to use low boiling, volatile compounds to modify surface energies. However, using volatile compounds requires the repetition of the procedure.

The object of the present invention is therefore to provide curable compositions based on silicon-containing polymers having anti-bacteria fouling which overcomes at least some of the drawbacks of known systems.

It has surprisingly been found that a curable composition comprising at least one silicon-containing polymer and at least one polysiloxane polyalkyleneglycol brush copolymer can modify surface energies of the cured composition. In particular, the polysiloxane polyalkyleneglycol brush copolymer as defined herein can modify the surface energies of the cured composition with a long-term effect after one-time application.

In accordance with a first aspect of the present invention therefore relates to a curable composition comprising a) at least one polymer having at least one silicon-containing group of Formula (A)

(A), wherein each $R^1$ is independently selected from a hydrocarbon radical containing 1 to 20 C atoms or a triorganosiloxane group of formula —O—Si($R^2$)$_3$, wherein each $R^2$ is independently selected from a hydrocarbon radical containing 1 to 20 C atoms; each Y is independently selected from a hydroxy group or a hydrolysable group; and k is 0, 1 or 2;

b) at least one hydroxyl-functionalized polysiloxane polyalkyleneglycol brush copolymer of the structure [A(-X—B)]$_s$, wherein A represents said polysiloxane backbone;

B represents said polyalkyleneglycol side chain;

X is a linker group characterized by including the moiety Si—C—C— of which said Si is a part of the polysiloxane backbone A; and s is an integer of from 1 to 100.

In a further aspect, the invention relates to an adhesive, sealant, or coating material comprising the curable composition as described above.

The invention is further directed to the use of the curable composition as defined above in an adhesive, sealant, and/or coating material, preferably for the modification of surface energies.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) carried out using HP1090 II Chromatography with DAD detector (HEWLETT PACKARD) at 40° C. Tetrahydrofuran (THF) was used as an eluent. THF was passed through three PSS SDV gel columns with molecular weight ranges of 102, 103 and 104 g·mol$^{-1}$ with a flow rate of 0.9 ml·min$^{-1}$. The calibration of the device was carried out using polystyrene standards.

As used herein, "polydispersity index" refers to a measure of the distribution of molecular mass in a given polymer sample. The polydispersity index is calculated by dividing the weight average molecular weight (Mw) by the number average molecular weight (Mn).

For convenience in the description of the process of this invention, unsaturation provided by $CH_2$=CH—$CH_2$— terminal group is referred to as "ally/" unsaturation.

As used herein, "$C_1$-$C_8$ alkyl" group refers to a monovalent group that contains 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl;

and, 2-ethylhexyl. In the present invention, such alkyl groups may be unsubstituted or may be substituted with one or more substituents such as halo, nitro, cyano, amido, amino, sulfonyl, sulfinyl, sulfaryl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)—should be noted.

The term "$C_3$-$C_{18}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl; tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

The terms "$C_1$-$C_{60}$ alkylene group" and "$C_1$-$C_{20}$ alkylene group" refer respectively to divalent groups that contain from 1 to 60 or from 1 to 20 carbon atoms, that are radicals of an alkane and include linear, branched organic or cyclic groups, which groups may contain at least one heteroatom, e.g., which may be substituted or substituted and may optionally be interrupted by at least one heteroatom.

As used herein, the term "arylene" group refers to a divalent group that is a radical of an aryl group. Suitable arylene group includes phenylene, furanylene, piperidylene, and naphthylene.

As used herein, the term "aralkylene" group refers to a divalent group that is a radical of an aralkyl group. An aralkylene can be represented by the formula —R—Ar— where R is an alkylene and Ar is an arylene, i.e., an alkylene is bonded to an arylene. Suitable aralkylene groups include xylylene and toluenylene.

Where mentioned, the expression "contain at least one heteroatom" means that the main chain or side chain of a residue comprises at least one atom that differs from carbon atom and hydrogen. More particularly the term "heteroatom" refers to nitrogen, oxygen, silicon, phosphorous, halogens, or sulfur. Oxygen (O) and nitrogen (N) may be mentioned as typical heteroatoms in the context of the present invention.

The term "polymerization conditions" means the reaction conditions necessary to combine monomers into polymers, and in the context of this invention, those conditions necessary for ring-opened alkylene oxides to combine with one another to form a polyether polymer.

As used herein, the term "ring-opening polymerization" denotes a polymerization in which a cyclic compound (monomer) is opened to form a linear polymer. Reference in this context may be made to inter alia in: i) Duda, A. et al. *Thermodynamics and Kinetics of Ring-Opening Polymerization in Handbook of Ring-Opening Polymerization*, Wiley-VCH, Weinheim, Germany, (2009) page 8; ii) Choijnowski, J. et al. *Kinetically controlled ring-opening polymerization*, J. Inorg. Organomet. Polym. (1991) 1, pages 299-323; and, iii) Nuyken et al. *Ring-Opening Polymerization-An Introductory Review Polymers* 2013, 5, 361-403.

As used herein, the term "catalytic amount" means a sub-stoichiometric amount of catalyst relative to a reactant.

As used herein, a double metal cyanide catalyst complex comprises a double metal cyanide (DMC) compound, at least one organic complexing agent and a metal salt. That complex may be unsupported or supported on an appropriate support material.

As used herein, the term "halogen" refers to fluorine, chlorine, bromine or iodine and correspondingly the term "halide" denotes fluoride, chloride, bromide or iodide anions.

The term "anhydrous" is intended to mean herein that the applicable reaction mixture or component comprises less than 0.25 wt. % of water, based on the weight of the mixture or component. The term "essentially free of solvent" should be interpreted analogously as meaning the relevant composition comprises less than 0.25 wt. % of solvent.

In Formula (I), (II), and (V), the different siloxane sub-units n, n1, n2, n3, and p are not necessarily present in the order as illustrated herein. The subunits n, n1, n2, n3 and p can be randomly distributed in the polysiloxane backbone in every possible combination.

Component a)

There are no special limitations on the polymer backbone of the at least one polymer a), and all known polymers having various types of main chain backbones may be used. In various embodiments, polymer a) is therefore selected from alkyd resins, (meth)acrylate polymers and (meth)acrylamide polymers and the salts thereof, phenolic resins, polyalkylenes, polyamides, polycarbonates, polyols, polyethers, polyesters, polyurethanes, vinyl polymers, polysiloxanes, and copolymers composed of at least two of the above-mentioned polymer classes.

Polyols/polyethers, in particular polyethylene oxide and/or polypropylene oxide, or polysiloxanes are particularly preferably used.

According to another preferred embodiment of the composition according to the invention, the molecular weight $M_n$ of the polymer backbone is between 500 and 100,000 g/mol. Molecular weight ranges of 5000 to 25,000 g/mol are particularly preferred, and of 8000 to 20,000 g/mol are very particularly preferred. These molecular weights are particularly advantageous, since compositions with these molecular weights have viscosities which facilitate processing. The polymers may be straight-chain or branched in each case.

The silicon-containing group of formula (A) as defined herein is a reactive group in which a hydroxy group or a hydrolysable group is bound to the silicon atom, and which is capable of crosslinking by forming a siloxane bond. This crosslinking reaction may be accelerated by a silanol condensation catalyst.

The reactive group has the formula —Si($R^1$)$_k$(Y)$_{3-k}$ (A), wherein each $R^1$ is independently selected from a hydrocarbon radical containing 1 to 20 C atoms or a triorganosiloxane group of formula —O—Si($R^2$)$_3$, wherein each $R^2$ is independently selected from a hydrocarbon radical containing 1 to 20 C atoms, each Y is independently selected from a hydroxy group or a hydrolysable group, and k is 0, 1, or 2, preferably 1 or 2. In various embodiments, each $R^1$ is independently selected from the group consisting of vinyl group, an alkyl group containing 1 to 20 C atoms, an aryl group containing 6 to 20 C atoms, an aralkyl group containing 7 to 20 C atoms, and a triorganosiloxane group of formula —O—Si(R²)₃ as defined above. If multiple Y radicals are contained, these may be the same or different.

Examples of hydrolysable groups include but are not limited to a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group, and the like. Alkoxy groups, in particular methoxy and ethoxy groups, and oxime groups, acetoxy groups and lactate groups are particularly preferred. The term "oxime groups" as used herein includes ketoximes and aldoximes, and refers in general to groups which contain the functional group R'₂C=N—O—, wherein the oxygen atom is bound to the silicon atom, and R' may be H or another group, preferably an alkyl group.

Examples of $R^1$ in Formula (A) described above include a vinyl group, alkyl groups, such as a methyl group and an ethyl group, cycloalkyl groups, such as a cyclohexyl group, aryl groups, such as a phenyl group, aralkyl groups, such as a benzyl group, and a trimethylsiloxy group.

Specific examples of the reactive silicon-containing groups include dimethoxyvinylsilyl, dimethoxymethylsilyl, diethoxymethylsilyl, trimethoxysilyl, and diisopropoxymethylsilyl groups.

In various embodiments, one polymer molecule in each case contains two or more of the above-described reactive groups.

Methods for inserting reactive silicon-containing groups, preferably end groups, into polymers are well known in the prior art.

The reactive silicon-containing group may be situated on one or both ends of the main chain, within the main chain, or within or on the end of one or more side chains.

The quantity of the reactive polymer a) described herein may be 1 to 99% by weight, preferably 30 to 90% by weight, based on the total weight of the curable composition.

As polymer component a), the above-described polymers may be used in each case either alone or in combinations of two or more thereof. If combinations of two or more polymers are used, the polymers that are used may differ in their monomer composition and/or their molecular weight.

Component b)

The hydroxyl-terminated polysiloxane polyalkyleneglycol brush copolymers according to the invention has the structure [A(-X—B)]s, wherein:

A represents said polysiloxane backbone;

B represents said polyalkyleneglycol side chain;

X is a linker group characterized by including the moiety Si—C—C— of which said Si is a part of the polysiloxane backbone A; and, s is an integer of from 1 to 100.

The hydroxyl-functionalized polysiloxane polyalkyleneglycol brush copolymer can be further characterized by the number average molecular weight (Mn) of from 1000 to 200,000 g/mol, preferably from 2000 to 100,000 g/mol.

In some embodiments, the hydroxyl-functionalized polysiloxane polyalkyleneglycol brush copolymer has a polydispersity index (PDI) in the range from 1.3 to 5.0, preferably from 1.6 to 3.0.

In preferred embodiments, the hydroxyl-functionalized polysiloxane polyalkyleneglycol brush copolymer can be represented by Formula (I)

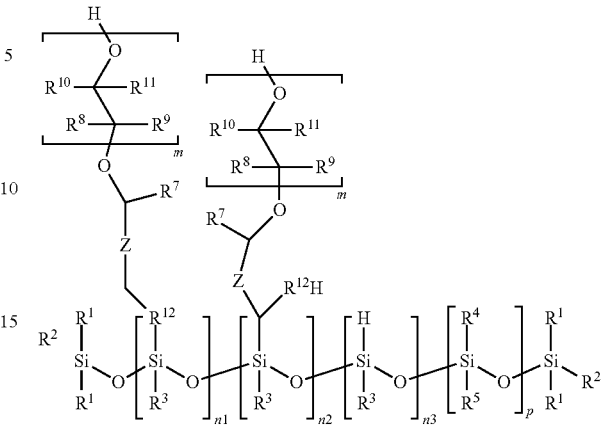

Formula (I)

wherein:

Z is a covalent bond or selected from a polyoxyalkylene having a molecular weight of less than 10000 g/mol or a linear, branched or cyclic hydrocarbon residue having 1 to 20 carbon atoms which may contain at least one heteroatom;

$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, and p;

$R^{12}$ is selected from a linear, branched or cyclic hydrocarbon residue having 1 to 20 carbon atoms which may contain at least one heteroatom;

$R^7$ is selected from hydrogen or a linear, branched or cyclic hydrocarbon residue having 1 to 20 carbon atoms which may contain at least one heteroatom;

$R^8$, $R^9$, $R^{10}$ and $R^{11}$ may be the same or different and in each unit m they are independently selected from hydrogen or a linear, branched or cyclic hydrocarbon residue having 1 to 20 carbon atoms which may contain at least one heteroatom;

n1 and n2 is an integer independently selected from 0 to 1000, preferably from 2 to 500, more preferably from 5 to 100, with the proviso that not both of n1 and n2 are 0; n3 is an integer from 0 to 1000;

p is an integer from 0 to 1000, preferably from 1 to 500, more preferably from 5 to 100; and m is an integer from 1 to 1500, preferably from 1 to 1000. In certain embodiments, n1 is selected from 1 to 1000 and n2 is selected from 0 to 1000, in particular n1 is 1 to 1000 and n2 is 0. Alternatively, in certain embodiments, n1 is selected from 0 to 1000, in particular 0, and n2 is selected from 1 to 1000.

In Formula (I) Z is a covalent bond or selected from a polyoxyalkylene having a molecular weight of less than 10000 g/mol or a linear, branched or cyclic hydrocarbon residue having 1 to 20 carbon atoms which may contain at least one heteroatom, preferably selected from a $C_1$-$C_{20}$ alkylene group, more preferably a $C_1$-$C_8$ alkylene group, a $C_6$-$C_{18}$ arylene group or a $C_6$-$C_{18}$ aralkylene group, which may contain at least one heteroatom, preferably selected from O, N, S, Cl, Br or F.

In more preferred embodiments, Z is selected from a $C_1$-$C_{20}$ alkylene group, in particular a $C_1$-$C_8$ alkylene group, a $C_6$-$C_{18}$ arylene group or a $C_6$-$C_{18}$ aralkylene group, which may contain at least one heteroatom, preferably selected from O, N, S, Cl, Br or F. In particular, Z is a $C_1$-$C_{20}$ alkylene group, more preferably a $C_1$-$C_8$ alkylene group, which may contain at least one heteroatom, preferably selected from O, N, S, Cl, Br or F, in particular O. In particularly preferred embodiments, Z is a $C_1$-$C_8$ alkylene group which contains O.

In Formula (I) $R^7$ is selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Cl, Br or F. In more preferred embodiments, $R^7$ is selected from hydrogen or a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Cl, Br or F. In most preferred embodiments, $R^7$ is selected from hydrogen or a $C_1$-$C_8$ alkyl group, in particular methyl group.

In Formula (I) $R^{12}$ is selected from a linear, branched or cyclic hydrocarbon residue having 1 to 20 carbon atoms which may contain at least one heteroatom, preferably $CR^a_2$ where each $R^a$ may be the same or different and is independently selected from hydrogen, a $C_1$-$C_{12}$ alkyl group, in particular a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably selected from O, N, S, Si, Cl, Br or F. Alternatively, both $R^a$ can form a cyclic structure which may contain at least one heteroatom.

In preferred embodiments, both $R^a$ are hydrogen.

In Formula (I), $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, which may contain at least one heteroatom, preferably O, N, S, Cl, Br or F. In particular, $R^3$, $R^4$ and $R^5$ may be independently selected in each siloxane unit, i.e., unit n1, n2, n3, and p. In more preferred embodiments, $R^1$, $R^2$, $R^3$, $R^4$ and $R^5$ may be the same or different and are independently selected from a $C_1$-$C_8$ alkyl group, more preferably a $C_1$-$C_4$ alkyl group, which may contain at least one heteroatom, preferably O, N, S, Cl, Br or F, in particular methyl, ethyl, n-propyl, fluoropropyl, n-butyl, sec-butyl, or tert-butyl, or a $C_6$-$C_{18}$ aryl group which may contain at least one heteroatom, preferably O, N, S, Cl, Br or F, in particular phenyl, tolyl or benzoyl. In most preferred embodiments, $R^1$, $R^2$, $R^3$, $R^4$ and $R^5$ are the same or different and independently selected from methyl or phenyl.

In Formula (I), each $R^8$, $R^9$, $R^{10}$ and $R^{11}$ may be the same or different and in each unit m they are independently selected from hydrogen or a linear, branched or cyclic hydrocarbon residue having 1 to 20 carbon atoms which may contain at least one heteroatom, preferably selected from a $C_1$-$C_{12}$ alkyl group, more preferably a $C_1$-$C_8$ alkyl group, a $C_3$-$C_{10}$ cycloalkyl group, a $C_6$-$C_{18}$ aryl group or a $C_6$-$C_{18}$ aralkyl group, with the proviso that at least one of $R^{10}$ and $R^{11}$ is not hydrogen and may contain at least one heteroatom, preferably selected from O, N, S or S. It is preferred that $R^8$, $R^9$ and $R^{11}$ are hydrogen and $R^{10}$ is either a phenyl group or a $C_1$-$C_8$ alkyl group and, more preferably, a $C_1$-$C_4$ alkyl group.

The quantity of hydroxyl-functionalized polysiloxane polyalkyleneglycol brush copolymer b) described herein may be 0.001 to 90% by weight, preferably 0.01 to 50% by weight, more preferably 0.1 to 20% by weight, based on the total weight of the curable composition.

First Exemplary Synthesis of Compound b) of Formula (I)

The exemplary synthesis for producing the hydroxyl-functionalized polysiloxane polyalkyleneglycol brush copolymer comprises the steps of:
a) reacting a hydroxyalkyl allyl ether having a primary or secondary alcohol group with a polyhydridosiloxane under anhydrous conditions and under catalysis of a transition metal catalyst of which the transition metal is selected from Groups 8 to of the Periodic Table to provide a hydroxyl-functionalized polysiloxane prepolymer having the Formula (II),

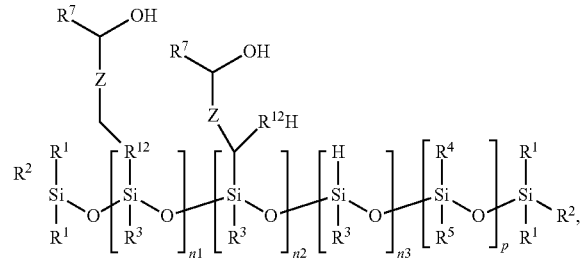

Formula (II)

wherein:
Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom;
$R^{12}$ is selected from a linear, branched or cyclic hydrocarbon residue having 1 to 20 carbon atoms which may contain at least one heteroatom;
$R^7$ is selected from hydrogen or a linear, branched or cyclic hydrocarbon residue having 1 to 20 carbon atoms which may contain at least one heteroatom;
n1 and n2 is an integer independently selected from 0 to 1000, preferably from 2 to 500, more preferably from 5 to100, with the proviso that not both of n1 and n2 are 0;
n3 is an integer from 0 to 1000; and
p is an integer from 0 to 1000, preferably from 1 to 500, more preferably from 5 to100,
said hydroxyalkyl allyl ether conforming to Formula (IV), and

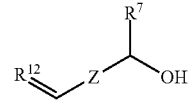

Formula (IV)

wherein Z, $R^{12}$ and $R^7$ are as defined above, said polyhydridosiloxane conforming to Formula (V)

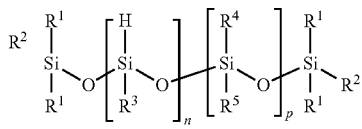

Formula (V)

wherein:
$R^1$, $R^2$, $R^3$, $R^4$, $R^5$ and p are as defined above; and
n is n1+n2+n3, and b) in the presence of the obtained hydroxyl-functionalized polysiloxane prepolymer of Formula (II) and a catalyst, performing a ring-opening polymerization of at least one alkylene oxide monomer having Formula (III):

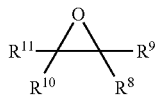

Formula (III)

wherein:
each $R^8$, $R^9$, $R^{10}$ and $R^{11}$ may be the same or different and are independently selected from hydrogen or a linear, branched or cyclic hydrocarbon residue having 1 to 20 carbon atoms which may contain at least one heteroatom.

The preferred embodiments with regard to $R^1$, $R^2$, $R^3$, $R^4$, $R^5$, $R^1$, $R^8$, $R^9$, $R^{10}$, $R^{11}$, Z, n1, n2, n3, p and m are as defined above.

The polyhydridosiloxane of Formula (V) contains —Si($R_4$)($R_5$)O— units, e.g., dimethylsiloxane units, in the backbone. The ratio between —Si(H)($R_3$)O— units and —Si($R_4$)($R_5$)O— units can be varied.

Importantly, the above hydrosilylation reaction is performed under anhydrous conditions and under catalysis, wherein the catalyst used is a transition metal catalyst of which the transition metal is selected from Groups 8 to 10 of the Periodic Table (https://iupac.org/what-we-do/periodic-table-of-elements/) and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3$ ($Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in synthesis step a) i) of this embodiment, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.03 to 72 hours to reach completion, more commonly from 0.25 to 30 or 0.25 to 16 hours.

Upon completion of the reaction, it is facile to remove any solid, suspended compounds by, for example, filtration, crossflow filtration or centrifugation. Further, the reaction product may be worked up, using methods known in the art, to isolate and purify the product. For example, any solvent present may be removed by stripping at reduced pressure.

In the step b), the "grafting from" polymerization of at least one alkylene oxide monomer onto a polysiloxane backbone in the presence of a catalyst, preferably DMC catalyst, as define herein.

Exemplary alkylene oxides used in step b) are: ethylene oxide, 1,2-propylene oxide, epichlorohydrin, 1,2-butylene oxide, 1,2-pentylene oxide, isopentylene oxide, 1,2-hexylene oxide, 1,2-heptylene oxide, styrene oxide, cyclohexene oxide, methylglycidyl ether, ethylglycidyl ether, allylglycidyl ether, phenylglycidyl ether, butadiene monooxide, isoprene monooxide, tolylglycidyl ether, cyclohexene oxide, cyclooctane epoxide, cyclododecane epoxide, (+)-cis-limonene oxide, (+)-cis, trans-limonene oxide and (−)-cis, trans-limonene oxide; preferred for this invention are ethylene oxide, 1,2-propylene oxide, commonly referred simply as propylene oxide, 1,2-butylene oxide, 2,3-butylene oxide, styrene oxide and cyclohexene oxide. Particular preference is given to using propylene oxide.

In case more than one alkylene oxide monomer are used, each $R^8$, $R^9$, $R^{10}$ and $R^{11}$ may be independently selected. In such a case, each $R^8$, $R^9$, $R^{10}$ and $R^{11}$ in Formula (I) are independently selected in each unit m.

Suitable catalysts, which may be used individually or in admixture, include: alkali metal hydroxides such as KOH, NaOH and CsOH; alkaline earth metal hydroxides, such as $Ca(OH)_2$ and $Sr(OH)_2$; alkali metal alkoxides, such as KOMe, NaOMe, KOt-Bu and NaOt-Bu; alkali earth metal alkoxides, such as $Ca(OMe)_2$ and $Sr(OMe)_2$; and double metal cyanide catalyst. The catalysts can typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

In preferred embodiments the reaction in step b) is catalyzed by a double metal cyanide (DMC) catalyst. Double metal cyanide catalyst complexes and the methods by which such complexes may be prepared are known in the art. The attention of the reader may, for example, be directed to: US 2008/0167502 (BASF); US 2003/0158449 (Bayer); US 2003/0069389 (Shell); US 2004/0220430 (Repsol Quimica); US 2005/0065383 (Dow); WO2012/136657 A1

(Henkel AG & Co. KGaA); EP0894108 (Arco); U.S. Pat. No. 5,767,323 (Yiannakis et al.); and, U.S. Pat. No. 5,536,883 (Arco).

The amount of DMC catalyst required for the synthesis of the hydroxyl-functionalized polysiloxane polyalkyleneglycol brush copolymer according to the present invention is preferably in the range of 10 to 5000 ppm, most preferably between 50 to 500 ppm, based on the weight of the final product.

The polymerization reaction can be carried out in a semi-batch mode where the hydroxyalkyl-functionalized polysiloxane prepolymer of Formula (II) and the catalytic amount of the catalyst, preferably DMC catalyst, are charged in the reactor and pre-heated under vacuum to eliminate adventitious water. A portion of the alkylene oxide of Formula (III) is fed into the reactor at the desired temperature. The activation of the catalyst is noted by the sudden pressure decrease after which the rest of the alkylene oxide is continuously added at a certain rate until the required amount of monomer necessary to achieve the desired molecular weight of product is inside the reactor. The reaction temperature for this procedure can range between 0 and 300° C., being specially desired between 6° and 240° C.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

According to the above-described synthetic pathway, hydroxyl-functionalized polysiloxane polyalkyleneglycol brush copolymer which contains less than 500 ppm mol %, preferably less than 10 ppm mol %, more preferably less than 2 ppm mol %, of SiH moiety—which is not converted—based on the total moles of the silicon atom which constitutes the polysiloxane backbone can be obtained.

By virtue of the "grafting from" polymerization, the second reaction step b) offers the opportunity to have complete control of the number of alkoxylated side-chains in the polysiloxane backbone, as well as the complete control of degree of polymerization of polyether side chains. In addition to that, low molecular weight by-products can be avoided.

Second Exemplary Synthesis of Compound b) of Formula (I)

In accordance with this second exemplary synthesis, said hydroxyl-functionalized polysiloxane polyalkyleneglycol brush copolymer of Formula (I) is obtainable by a method comprising the step of reacting a hydroxyalkyl allyl ether having a primary, secondary or tertiary alcohol group of Formula (VI) with a polyhydridosiloxane of Formula (V) under anhydrous conditions and under catalysis of a transition metal catalyst of which the transition metal is selected from Groups 8 to 10 of the Periodic Table,

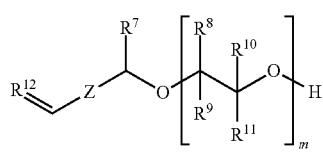

Formula (VI)

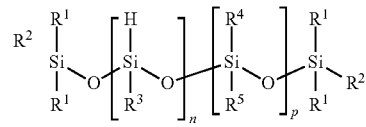

Formula (V)

wherein:
$R^1$, $R^2$, $R^3$, $R^4$, $R^5$, $R^7$, $R^8$, $R^9$, $R^{10}$, $R^{11}$, $R^{12}$, Z, m, and p are as defined above; and
n is n1+n2+n3.

Compounds conforming to Formula (VI) are most suitably derived as alkylene oxide adducts of primary or secondary alcohols having allyl unsaturation. Suitable alcohols having allyl unsaturation for use in the present invention include: allyl alcohol; methallyl alcohol; 3-buten-1-ol; isoprenol (3-methyl-3-buten-1-ol); 2-methyl-3-buten-1-ol; 2-methyl-3-buten-2-ol; 1-penten-3-ol; 3-methyl-1-penten-3-ol; and, 4-methyl-1-penten-3-ol. Particular preference is given to using allyl alcohol or methallyl alcohol.

Said alkylene oxide which can be used to prepare said hydroxyalkyl allyl ether of Formula (VI) can be represented by Formula (III) as defined herein. Suitable alkylene oxide reactants include one or more of: propylene oxide; 1,2-butylene oxide; cis-2,3-epoxybutane; trans-2,3-epoxybutane; 1,2-epoxypentane; 1,2-epoxyhexane; decene oxide; and, styrene oxide. Particular preference is given to using propylene oxide.

Any known method for forming such adducts may be employed. However, commonly, in the presence of a basic catalyst, a controlled amount of alkylene oxide is slowly mixed with the preheated alcohol over a reaction time of up to 20 hours and in an amount sufficient to form the desired oxyalkylated reaction product. The unsaturated alcohol should be free of water and may therefore be vacuum stripped in advance of being preheated to a temperature, typically, of from 75 to 150° C.

During the introduction of the oxide, the concentration of unreacted alkylene oxide in the liquid reaction mixture and the current degree of addition of the alkylene oxide onto the unsaturated starter can be monitored by known methods. These methods include, but are not limited to: optical methods, such as Infrared and Raman spectroscopy; viscosity and mass flow measurements, after appropriate calibration; measurement of the dielectric constant; and, gas chromatography.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

Suitable basic catalysts are as describe above in the first exemplary synthesis.

For completeness, illustrative citations describing the alkoxylation of allyl alcohol include: U.S. Pat. Nos. 9,073,836; 3,268,561; 4,618,703; and, J. Am. Chem. Soc. 71 (1949) 1152.

The hydroxyalkyl-allyl ether of Formula (VI) and the polyhydridosiloxane of Formula (V) are generally reacted at a molar ratio of allyl groups of said adduct to SiH groups of said polysiloxane of from 0.8:1 to 1.2: 1, in particular 1:1. The reaction may be carried out under atmospheric or elevated pressure. Further, the reaction is carried out at a temperature from 25 to 250° C. and preferably from 70 to 200° C. And in carrying out the reaction, organic solvents may or may not be used but, when employed, solvents such as toluene, xylene, heptane, dodecane, ditolylbutane, cumene and mixtures thereof are preferred.

The reaction may be performed under anhydrous conditions and in the presence of a catalyst, wherein the catalyst used may be a transition metal catalyst of which the transition metal is selected from Groups 8 to 10 of the Periodic Table and more usually from the group consisting of ruthenium, rhodium, palladium, osmium, iridium, platinum and combinations thereof as described with regard to the first exemplary synthesis.

The progress of the reaction and, in particular, the consumption of the unsaturated group of the hydroxyalkyl allyl ether can be monitored by known methods. This aside, the reaction generally requires a time of 0.5 to 72 hours to reach completion, more commonly from 1 to 30 or 1 to 20 hours.

Upon completion of the reaction, it is facile to remove any solid, suspended compounds by, for example, filtration, cross-flow filtration or centrifugation. Further, the reaction product—of Formula (I)—may be worked up, using methods known in the art, to isolate and purify the product. For example, any solvent present may be removed by stripping at reduced pressure.

Other Components

In preferred embodiments, the composition can contain at least one compound c) which has a hydrolysable silicon-containing group and a molecular weight in the range of 100 to 1000 g/mol. This compound is used as a crosslinking agent, and in addition to the hydrolysable silicon-containing group may contain further functional groups. The compound may be a silane coupling agent.

This type of coupling agent may be used as a tackifier, as an agent which influences the physical properties, as a drying agent, as a dispersion aid, or as a filler or the like. In particular, such a silane coupling agent can act as an adhesion promoter and increase the adhesion to various surfaces, for example glass, aluminum, stainless steel, zinc, copper, mortar, PVC, acrylic resins, polyester, polyethylene, polypropylene, and polycarbonate. Such a silane coupling agent may include reactive silicon-containing groups which may be defined analogously to the groups described above in conjunction with polymer component a). Alternatively, the groups may also be those of the following formula: —$(Si(R^1)_{2-e}(X)_e$—$O)_k$—$SI(R^1)_{3-d}X_d$, wherein each $R^1$ is the same as defined for formula (I), X is independently selected from a hydroxyl group or a hydrolysable group, preferably an oxime group, alkoxy group, an acetoxy group, a lactate group, or a malate group, e is 0, 1, or 2, d is 0, 1, 2, or 3, where d and e are both not 0, and k is 0 or an integer from 1 to 19, where d is not 0 when k is 0.

Compound c) may contain further functional groups, including but not limited to primary, secondary, or tertiary amino groups, mercapto groups, epoxy groups, carboxyl groups, vinyl groups, isocyanate groups, isocyanurate groups, halogens, and the like.

Specific examples of these coupling agents include but are not limited to silanes containing isocyanate groups, such as gamma-isocyanate propyltrimethoxysilane, gamma-isocyanate propyltriethoxysilane, gamma-Isocyanate propylmethyldiethoxysilane, gamma-isocyanate propylmethyldimethoxysilane, (isocyanate methyl)trimethoxysilane, (isocyanate methyl)methyldimethoxysilane, (isocyanate methyl)triethoxysilane, and (isocyanate methyl)diethoxymethylsilane; silanes containing amino groups, such as gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl) aminopropyltriethoxysilane, gamma-(2-aminoethyl) aminopropylmethyldiethoxysilane, gamma-(2-aminoethyl) aminopropyltriisopropoxysilane, gamma-(6-aminohexyl) aminopropyltrimethoxysilane, 3-(N-ethylamino)-2-methylpropyltrimethoxysilane, gamma-ureidopropyltrimethoxysilane, gamma-ureidopropyltriethoxysilane, N-phenyl-gamma-aminopropyltrimethoxysilane, N-benzyl-gamma-aminopropyltrimethoxysilane, N-vinylbenzyl-gamma-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl] ethylenediamine; silanes of the ketimine type, such as N-(1, 3-dimethylbutylidene)-3-(triethoxysilyl)-1-propanamine; silanes containing mercapto groups, such as gamma-mercaptopropyltrimethoxysilane, gamma-mercaptopropyltriethoxysilane, gamma-mercaptopropylmethyldimethoxysilane, gamma-mercaptopropylmethyldiethoxysilane, mercaptomethyltrimethoxysilane, and mercaptomethyltriethoxysilane; silanes containing epoxy groups, such as gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane, and beta-(3,4-epoxycyclohexyl) ethyltriethoxysilane; carboxysilanes, such as beta-carboxyethyltriethoxysilane, beta-carboxyethylphenylbis(2-methoxyethoxy)silane, and N-beta-(carboxymethyl) aminoethyl-gamma-aminopropyltrimethoxysilane; silanes containing unsaturated groups of the vinyl type, such as vinyltrimethoxysilane, vinyltriethoxysilane, gamma-methacryloyloxypropylmethyldimethoxysilane, gamma-acryloyloxypropyltriethoxysilane, and methacryloyloxymethyltrimethoxysilane; silanes containing halogen, such as gamma-chloropropyltrimethoxysilane; and isocyanurate silanes, such as tris(3-trimethoxysilylpropyl)isocyanurate. In addition, partially condensed products or reaction products of the above-mentioned silanes may be used. Aminosilanes are particularly preferred within the scope of the present invention.

Examples of compounds c) which contain no additional functional groups include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-isopropoxysilane, tetra-n-butoxysilane, tetra-isobutoxysilane, and tetra-t-butoxysilane; trialkoxysilanes, such as methyltrimethoxysilane, methyltriethoxysilane, methyltriisopropoxysilane, methyltriphenoxysilane, ethyltrimethoxysilane, butyltrimethoxysilane, and phenyltrimethoxysilane; dialkoxysilanes, such as dimethyldimethoxysilane, diethyldimethoxysilane, and diphenyldimethoxysilane; monoalkoxysilanes, such as trimethylmethoxysilane and triphenylmethoxysilane; alkylisopropenoxysilanes, such as dimethyldiisopropenoxysilane and methyltriisopropenoxysilane; and the partially hydrolyzed condensates of these silanes.

The quantity of the crosslinking agent c) may be 2.5 to 7% by weight, more preferably 2.7 to 6.5% by weight, most preferably 3 to 6% by weight, based on the total weight of the curable composition.

According to preferred embodiments according to the invention, the curable composition also contains at least one compound selected from the group comprising plasticizers, stabilizers, fillers, reactive diluents, drying agents, adhesion promoters, rheological aids, and/or solvents.

It is conceivable that the viscosity of the adhesive, sealant, or coating materials according to the invention may be too high for certain applications. The viscosity may then generally be easily and suitably reduced or adjusted by using a reactive diluent, without resulting in demixing effects (for example, plasticizer migration) in the cured compound.

The reactive diluent preferably has at least one functional group which reacts with moisture or atmospheric oxygen, for example, after application. Examples of such groups are silyl groups, isocyanate groups, vinylically unsaturated groups, and multiply unsaturated systems.

All compounds which are miscible with the adhesive, sealant, or coating materials with reduction of the viscosity and which have at least one group that is reactive with the binder may be used as reactive diluent.

The viscosity of the reactive diluent is preferably less than 20,000 mPas, particularly preferably about 0.1-6000 mPas, very particularly about 1-1000 mPas (Brookfield RVT, 23° C., spindle 7, 10 rpm).

The following materials, for example, may be used as reactive diluent: polyalkylene glycols reacted with isocyanatosilanes (for example, Synalox 100-50B, DOW), carbamatopropyltrimethoxysilane, alkyltrimethoxysilanes and alkyltriethoxysilanes such as methyltrimethoxysilane, methyltriethoxysilane, and vinyltrimethoxysilane (XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyl)silylmethyl-O-methylcarbamate (XL65, Wacker), hexadecyltrimethoxysilane, 3-octanoylthio-1-propyltriethoxysilane, and partial hydrolysates of these compounds.

The following polymers from Kaneka Corp. are likewise usable as reactive diluent: MS S203H, MS S303H, MS SAT 010, and MS SAX 350.

Silane-modified polyethers which are derived, for example, from the reaction of isocyanatosilane with Synalox types may likewise be used.

Also usable as reactive diluent are polymers which are producible from an organic backbone by grafting with a vinylsilane or by reacting polyol, polyisocyanate, and alkoxysilane.

A polyol is understood to mean a compound which may contain one or more hydroxyl (OH) groups in the molecule. The OH groups may be primary as well as secondary or tertiary.

Examples of suitable aliphatic alcohols include ethylene glycol, propylene glycol, and higher glycols, as well as other polyfunctional alcohols. The polyols may additionally contain further functional groups such as esters, carbonates, and amides.

For producing the reactive diluents preferred according to the invention, the corresponding polyol component in each case is reacted with an at least difunctional isocyanate. As at least difunctional isocyanate, any isocyanate having at least two isocyanate groups is suitable in principle; however, within the scope of the present invention, compounds having two to four isocyanate groups, in particular two isocyanate groups, are generally preferred.

The compound which is present as reactive diluent within the scope of the present invention preferably has at least one alkoxysilyl group, with the di- and trialkoxysilyl groups being preferred among the alkoxysilyl groups.

Suitable as polyisocyanates for producing a reactive diluent, for example, are ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, and mixtures of two or more thereof, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI) or the partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate and partially or completely hydrogenated cycloalkyl derivatives thereof, 4,4'-diisocyanatophenylperfluoroethane, phthalic acid-bis-isocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates which are obtainable by reacting 2 mol diisocyanate with 1 mol thiodiglycol or dihydroxydihexylsulfide, the di- and triisocyanates of dimer and trimer fatty acids, or mixtures of two or more of the stated diisocyanates.

Trivalent or higher-valent isocyanates, which are obtainable, for example, by oligomerization of diisocyanates, in particular by oligomerization of the above-mentioned isocyanates, may likewise be used as polyisocyanates. Examples of such trivalent and higher-valent polyisocyanates are the triisocyanurates of HDI or IPDI or mixtures thereof or mixed triisocyanurates thereof, and polyphenylmethylene polyisocyanate, which is obtainable by phosgenation of aniline-formaldehyde condensation products.

Solvents and/or plasticizers may be used in addition to or instead of a reactive diluent for reducing the viscosity of the composition according to the invention.

Aliphatic or aromatic hydrocarbons, halogenated hydrocarbons, ketones, ethers, esters, ester alcohols, keto alcohols, keto ethers, keto esters, and ether esters are suitable as solvent.

The curable composition according to the invention may also contain hydrophilic plasticizers. These are used for improving the moisture absorption, and thus for enhancing the reactivity at low temperatures. Suitable as plasticizers, for example, are esters of abietic acid, adipic acid esters, azelaic acid esters, benzoic acid esters, butyric acid esters, acetic acid esters, esters of higher fatty acids containing approximately 8 to approximately 44 C atoms, esters of epoxidized fatty acids, fatty acid esters and fats, glycolic acid esters, phosphoric acid esters, phthalic acid esters, esters of linear or branched alcohols containing from 1 to 12 C atoms, propionic acid esters, sebacic acid esters, sulfonic acid esters, thiobutyric acid esters, trimellitic acid esters, citric acid esters, and esters based on nitrocellulose and polyvinyl acetate, and mixtures of two or more thereof.

Suitable among the phthalic acid esters, for example, are dioctyl phthalate, dibutyl phthalate, diisoundecyl phthalate, or butylbenzyl phthalate, and among the adipates are dioctyl adipate, diisodecyl adipate, diisodecyl succinate, dibutyl sebacate, or butyl oleate.

Likewise suitable as plasticizer are the pure or mixed ethers of monofunctional, linear, or branched $C_{4-16}$ alcohols or mixtures of two or more different ethers of such alcohols, for example dioctyl ether (obtainable as Cetiol OE, Cognis Deutschland GmbH, Dusseldorf).

Polyethylene glycols which are closed by a terminal group are also suitable as plasticizer. Examples are polyethylene glycol or polypropylene glycol di-$C_1$-4 alkyl ethers, in particular the dimethyl or diethyl ethers of diethylene glycol or dipropylene glycol, and mixtures of two or more thereof.

Particularly preferred as plasticizer, however, are polyethylene glycols which are closed by a terminal group, such as polyethylene glycol dialkyl ethers or polypropylene glycol dialkyl ethers, wherein the alkyl radical is one to four C atoms, and in particular the dimethyl and diethyl ethers of diethylene glycol and dipropylene glycol. In particular, acceptable curing, even under fairly unfavorable application conditions (low humidity, low temperature) is achieved with dimethyldiethylene glycol. Reference is made to the relevant literature in technical chemistry for further particulars concerning plasticizers.

Likewise suitable as plasticizer within the scope of the present invention are diurethanes, which may be produced, for example, by reacting diols having OH end groups with monofunctional isocyanates, by selecting the stoichiometry in such a way that essentially all free OH groups react. Any excess isocyanate may subsequently be removed, for example, by distillation from the reaction mixture. Another method for producing diurethanes is to react monofunctional alcohols with diisocyanates, with preferably all NCO groups reacting.

The curable composition according to the invention may also contain up to approximately 20% by weight of customary adhesion promoters (tackifiers). Suitable as adhesion promoters, for example, are resins, terpene oligomers, coumarone/indene resins, aliphatic petrochemical resins, and modified phenolic resins. Suitable within the scope of the present invention, for example, are hydrocarbon resins which are obtained by polymerization of terpenes, primarily α- or β-pinene, dipentene, or limonene. The polymerization of these monomers generally takes place cationically with initiation with Friedel-Crafts catalysts. The terpene resins also include, for example, copolymers of terpenes and other monomers, for example styrene, α-methylstyrene, isoprene, and the like. The stated resins are used, for example, as adhesion promoters for contact adhesives and coating materials. Likewise suited are terpene phenolic resins, which are produced by acid-catalyzed addition of phenols to terpenes or colophony. Terpene phenolic resins are soluble in most organic solvents and oils and miscible with other resins, waxes, and rubber. Likewise suitable as additives within the scope of the present invention are colophony resins and derivatives thereof, for example esters thereof.

It is often expedient to further stabilize the compositions according to the invention against penetrating moisture by use of drying agents in order to further extend the shelf life.

Such an improvement in the shelf life may be achieved, for example, by the use of drying agents. All compounds which react with water to form a group that is inert with respect to the reactive groups present in the composition, and which in the process preferably experience little change in their molecular weight, are suitable as drying agent. Furthermore, the reactivity of the drying agents with respect to moisture that has penetrated into the composition must be higher than the reactivity of the groups of the silyl group-bearing polymer according to the invention present in the composition.

Isocyanates, for example, are suitable as drying agent.

Silanes are advantageously used as drying agent. Examples are vinylsilanes such as 3-vinylpropyltriethoxysilane, oxime silanes such as methyl-O,O',O''-butan-2-one-trioximosilane or O,O',O'',O'''-butan-2-one-tetraoximosilane (CAS Nos. 022984-54-9 and 034206-40-1), or benzamidosilanes such as bis(N-methylbenzamido)methylethoxysilane (CAS No. 16230-35-6) or carbamatosilanes such as carbamatomethyltrimethoxysilane. However, the use of methyl-, ethyl-, or vinyltrimethoxysilane or tetramethyl- or tetraethylethoxysilane is also possible. With regard to efficiency and cost, vinyltrimethoxysilane and tetraethoxysilane are particularly preferred here.

Likewise suitable as drying agent are the above-mentioned reactive diluents, provided that they have a molecular weight ($M_n$) of less than approximately 5,000 g/mol and have end groups whose reactivity with respect to penetrated moisture is at least as high as, preferably higher than, the reactivity of the reactive groups of the silyl group-bearing polymer according to the invention.

Lastly, alkyl orthoformates or orthoacetates, for example methyl or ethyl orthoformate, methyl or ethyl orthoacetate, may also be used as drying agent.

The curable composition according to the invention generally contains approximately 0 to approximately 6% by weight of drying agent.

The curable composition according to the invention may additionally contain fillers. Suitable examples here are chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances. In addition, organic fillers may also be used, in particular carbon black, graphite, wood fiber, wood flour, sawdust, cellulose, cotton, pulp, wood chips, chopped straw, and chaff. Moreover, short fibers such as glass fiber, glass filament, polyacrylonitrile, carbon fiber, Kevlar fiber, or also polyethylene fiber may be added. Powdered aluminum is likewise suitable as filler.

The pyrogenic and/or precipitated silicic acids advantageously have a BET surface area of 10 to 90 $m^2/g$. During use, they do not cause an additional increase in the viscosity of the composition according to the invention, but contribute to strengthening of the cured product.

It is likewise conceivable to use pyrogenic and/or precipitated silicic acids having a larger BET surface area, advantageously 100-250 $m^2/g$, in particular 110-170 $m^2/g$, as filler. Due to the larger BET surface area, the same effect, for example strengthening the cured product, may be obtained at a lower weight fraction. Further substances may thus be used to improve the composition according to the invention with regard to other requirements. Furthermore, hollow spheres having a mineral shell or a plastic shell are suitable as filler. These may be, for example, hollow glass spheres which are commercially available under the trade name Glass Bubbles©. Hollow spheres based on plastic, for example Expancel® or Dualite®, are described in EP 0 520 426 B1, for example. These are composed of inorganic or organic substances, each having a diameter of 1 mm or less, preferably 500 µm or less.

For some applications, fillers are preferred which impart thixotropy to the compositions. Such fillers are also described as rheological aids, for example hydrogenated castor oil, fatty acid amides, or swellable plastics such as PVC. To allow them to be easily pressed out of a suitable dosing device (a tube, for example), such compositions have a viscosity of 3000 to 15,000 mPas, preferably 40,000 to 80,000 mPas, or also 50,000 to 60,000 mPas.

The fillers are preferably used in a quantity of 1 to 80% by weight, based on the total weight of the curable composition.

The curable composition according to the invention may additionally contain at least one curing catalyst up to 5 wt. %, preferably from 0.01 to 3 wt. %, based on the total weight of the curable composition.

The catalysts that can be used are all known compounds that can catalyze hydrolytic cleavage of the hydrolyzable groups of the silane groups, as well as the subsequent condensation of the Si—OH group to yield siloxane groupings (crosslinking reaction and adhesion promotion function). Examples of catalysts, which can be used alone or in combination, include: titanates, such as tetrabutyl titanate and tetrapropyl titanate; tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides, such as dibutyltin oxide and dioctyltin oxide; reaction products between dibutyltin oxides and phthalic acid esters; dibutyltin bisacetylacetonate; organoaluminum compounds, such as aluminum trisacetylacetonate, aluminum trisethylacetoacetate, and diisopropoxyaluminum ethylacetoacetate; chelate compounds, such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo-(5,4,0)-undecene-7 (DBU); a low-molecular-weight polyamide resin obtained from an excess of a polyamine and a polybasic acid; adducts of a polyamine in excess with an epoxy; and, aminosilanes, such as 3-aminopropyltrimethoxysilane and N—(β-aminoethyl)aminopropylmethyldimethoxysilane.

Titanium complex as described in DE102014212291 A1 can be used.

The curable composition according to the invention is produced according to known methods by intimately mixing the components in suitable dispersion units, for example a high-speed mixer.

A further subject matter of the present invention relates to use of the composition according to the invention as an adhesive, sealant, or a coating material, preferably for the modification of surface energies. The composition according to the invention can also be used as a filling compound or for producing molded parts. A further field of application of the compositions according to the inventions is use as plugging, hole-filling, or spackling compound. The compositions according to the invention are thus suitable for adhesively bonding plastics, metals, glass, ceramic, wood, wood-based materials, paper, paper-based materials, rubber, and textiles, for gluing floors, sealing building elements, windows, wall and floor coverings, and jointing in general. In this regard, the materials in each case may be adhesively bonded to themselves or with any other of the stated materials.

Various features and embodiments of the disclosure are described in the following examples, which are intended to be representative and not limiting.

EXAMPLES

Example 1: Preparation of 1-(allyloxy)propan-2-ol

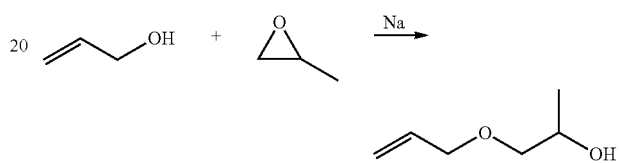

In a 1 L autoclave equipped with dosage system, 637.5 g (10.98 mol) of allyl alcohol were placed. Under argon flow, Na (2.9% mol) was added into the vessel. The mixture was stirred at room temperature until the gas evolution ceased. Then the autoclave was closed and heated until 110° C. In the next step PO was dosed (520 ml, dosage rate 1.25 g/min). After the completion of the addition of PO it was allowed to cool to room temperature and the reaction mixture was stirred overnight. A yellow transparent mixture was obtained. The mixture was neutralized using HCl (solution 37% in water) and dried with $Na_2SO_4$. The mixture was filtrated trough celite and distilled under vacuum (100 mbar, 85-95° C.). The product was obtained with good yield (70-75%) and the structure was confirmed by NMR spectroscopy and mass spectrometry.

Example 2: Preparation of (3-(2-hydroxypropoxy)propyl)methylsiloxane-co-polydimethylsiloxane

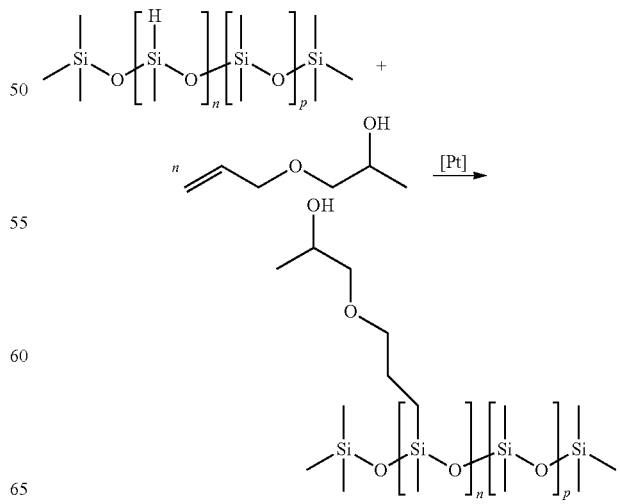

A 50 ml two neck round bottomed flask was degassed under high vacuum ($1^{-3}$ mbar) and flushed with argon. Then, 8.3 mg of Pt supported on charcoal (10% of Pt in the catalyst, 0.5% mol in the mixture) and toluene (10 ml, dried over molecular sieves) were added into the flask under argon atmosphere and stirred at room temperature (20° C.) for a couple of minutes. Then 1-(allyloxy)propan-2-ol (the product from example 1; 0.72 ml) was added into the system. Polyhydridomethylsiloxane-co-polydimethylsiloxane (2.5 g, Mn 2900 g/mol) were added dropwise. The mixture was stirred and refluxed (oil bath temperature: 120° C.) under inert atmosphere (Ar) until complete conversion of the Si—H groups was achieved (the reaction was followed by $^1$H-NMR). The mixture (when necessary) was decolorized by adding activated carbon and an excess of pentane and stirred for 16 h at room temperature. The crude was filtrated trough celite, and the solvents and volatiles were evaporated under vacuum. The obtained product (yield 55-65%) was a colorless, transparent viscous liquid. The molecular weight and structure of the product was confirmed by GPC and NMR spectroscopy. No traces of Pt were detectable in the mixture (by ICP).

Example 3: Preparation of Polydimethylsiloxane-graft-poly(propylene oxide)

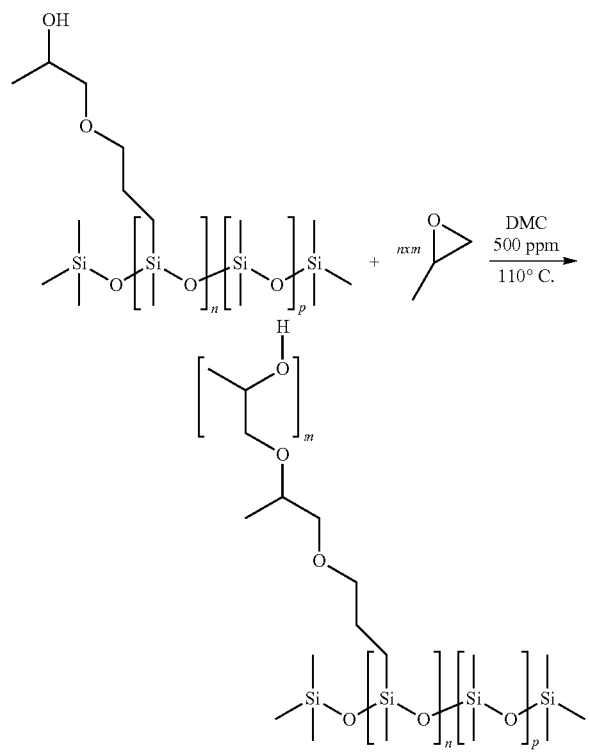

5.0 g of (3-(2-hydroxypropoxy)propyl)methylsiloxane-co-polydimethylsiloxane (from example 2 Mn: 3596 g/mol) were charged together with 0.015 g of the DMC catalyst (500 ppm based on the amount of the copolymer) and 20.0 g heptane in a 100 mL-stirring Autoclave. The reaction mixture was stirred at room temperature with constant stirring at 350 rpm for several minutes under vacuum (0.001 bar) and argon atmosphere (1 bar). Then the reaction temperature was increased at 110° C. After reaching this temperature, 7.0 mL of propylene oxide (PO) were added to the reaction mixture and stirred constantly at 350 rpm. After filtration the solvent and traces of unreacted monomer were removed under vacuum (0.001 bar) for three hours. The yield of the product was found to be 90%.

Example 4: F1 to F10 were prepared by mixing the raw materials listed in Table 1. In which the alkoxy base formulation consist of a mixture of 70 wt % α,ω-dimethoxyvinyl-terminated polydimethylsiloxane with an viscosity of 80000 cST (see exact procedure U.S. Pat. No. 5,663,269), 20 wt % polydimethylsiloxane with viscosity of 1000 cST, 9.8 wt % hydrophobic fumed silica and 0.2 wt % tetra-n-butyl titanate. F2 to F8 are according to the present invention with different amounts of polysiloxane polyalkyleneglycol brush copolymer prepared in Example 3. Instead of the polysiloxane polyalkyleneglycol brush copolymer, F9 and F10 contain linear PPG with two terminated OH-groups (Acclaim 8200) and branched PPG with three terminated OH-groups (Acclaim 6300), respectively.

TABLE 1

| | Formulations | | | | | | | | | |
|---|---|---|---|---|---|---|---|---|---|---|
| | F1 | F2 | F3 | F4 | F5 | F6 | F7 | F8 | F9 | F10 |
| Alkoxy base formulation [wt %] | 100 | 99 | 90 | 80 | 70 | 60 | 50 | 40 | 90 | 90 |
| polysiloxane polyalkyleneglycol brush copolymer [wt %] | — | 1 | 10 | 20 | 30 | 40 | 50 | 60 | — | — |
| Acclaim 8200 [wt %] | — | — | — | — | — | — | — | — | 10 | — |
| Acclaim 6300 [wt %] | — | — | — | — | — | — | — | — | — | 10 |

Measurement of skin formation time: The determination of the skin formation time was carried out under standard climate conditions (23+/−2° C., relative humidity 50+/−5%). The temperature of the sealant must be 23+/−2° C., with the sealant stored for at least 24 h beforehand in the laboratory. The sealant was applied to a sheet of paper and spread out with a putty knife to form a skin (thickness approximately 2 mm, width approximately 7 cm). The stopwatch was started immediately. At intervals, the surface was touched lightly with the fingertip and the finger was pulled away, with sufficient pressure on the surface that an impression remains on the surface when the skin formation time was reached. The skin formation time was reached when sealing compound no longer adheres to the fingertip.

Measurement of ShoreA hardness: The procedure was carried out in accordance with ISO 868.

Measurement of contact angles: The contact angle measuring instrument OCA 40 Micro from the Company DataPhysics the Chair of Fluid Technology and microfluidics was used for the automatic measurement and evaluation of static and dynamic contact angles according to the generalized length—height method for drop-on-fiber arrangement, the static and dynamic contact angle of microscopic objects by the sessile drop method and the automatic determination of the surface free energy of solids and their components. One distilled water drop with a defined volume was dropped on the surface. The contact angle was measured at the beginning and after 30, 60 and 90 seconds.

Anti-Adhesion Assay: This test is to determine the adhesive properties of a sealant surface towards fungal cells. The method can be used with either yeast cells or mold spores. After a sedimentation and adhesion phase of 60 min, the surfaces are washed, and the remaining cells are washed of using a detergent solution. Afterwards the cell count of that solution is determined by means of plating serial dilutions.

Preparation of cell suspension: Yeast cells were washed of a well grown plate using an inoculation loop and buffer (0.2% Tween80; 0.9% NaCl). The suspension was filtered through sterile glass wool to remove hyphal fragments. Cells were washed by means of centrifugation and resuspension in autoclaved tap water. This procedure was repeated once. The germ count was adjusted to ~1.0E+04 by measuring optical density at 600 nm or by employing a hemocytometer or similar methods.

Test procedure: For each sample six specimen were cut to fit in standard six-well plates (20×20 mm). The wells were filled with cell suspension ensuring that the specimens were completely overlaid. Wells were incubated at RT for 60 min to led cells sediment and adhere to the surface. Afterwards, each specimen was taken out with forceps. Washing took place by slowly dipping the specimen into five consecutive 1 l-beakers filled with water. Cell recovery was achieved by placing the specimen into a tube with glass beads and 5 ml buffer (0.3% Tween80; 0.9% NaCl; 0.1% Trypton). Tubes were shaken on rotary shaker for 5 min at 200 rpm. A germ count determination from each solution was performed using serial dilutions and an appropriate agar medium (e.g., wort agar). Mean and standard deviation was calculated from each set of six specimen. The mean germ count of each sample was compared to an appropriate control sample.

The results of the contact angle measurements are shown in Table 2. F1 showed no change in contact angle during time, while F2 to F8 showed a strong spreading effect (decrease of contact angle) of the water droplet during time. In some cases, the change of contact angle after 90 seconds can be more than 20 degrees. This invention discloses polymers with both a special branched microstructure, as well as the combination of different chemical groups which results in an increase of the material's surface energy. Hence, water droplets tend to spread to a higher extend in the formulations containing the brush copolymers according to the present invention, resulting in faster water evaporation and ultimately in a lower surface moisture. F9 and F10 showed a just slight droplet spreading during time.

TABLE 2

| | Skin formation time (min) | ShoreA 7 d | Contact Angle (°) t(0), t(30), t(60), t(90) |
|---|---|---|---|
| F1 | 90 | 19.0 | 103.9, 106.4, 104.8, 104.6 |
| F2 | 45 | 18.3 | 106.1, 105.3, 102.0, 99.9 |
| F3 | 40 | 21.3 | 95.9, 91.9, 86.1, 82.0 |
| F4 | 55 | 24.3 | 95.4, 89.9, 85.8, 82.5 |
| F5 | 50 | 21.7 | 110.7, 99.0, 92.3, 89.5 |
| F6 | 60 | 17.0 | 93.0, 88.1, 81.4, 78.5 |
| F7 | 70 | 17.7 | 96.2, 86.6, 81.3, 79.0 |
| F8 | 40 | 19.7 | 97.5, 74.1, 71.4, 69.9 |
| F9 | 70 | 19.7 | 86.2, 84.1, 83.2, 83.1 |
| F10 | 80 | 18.0 | 95.2, 93.6, 92.7, 92.3 |

Table 3 shows the results for the anti-adhesion assay against black yeasts of F2 to F8 compared to F1 as reference. A great improvement of anti-adhesion properties with F2 to F8 was achieved.

TABLE 3

| | F1 | F2 | F3 | F4 | F5 | F6 | F7 | F8 |
|---|---|---|---|---|---|---|---|---|
| Germination number compared to F1 (%) | 100 | 31 | 24 | 35 | 43 | 49 | 36 | 55 |

The invention claimed is:

1. A curable composition, comprising:

a) at least one polymer having a polymer backbone selected polyethers, and copolymers thereof and at least one silicon-containing group of Formula (A)

$$—Si(R^1)_k(Y)_{3-k} \qquad (A),$$

wherein each $R^1$ is independently selected from a hydrocarbon radical containing 1 to 20 C atoms or a triorganosiloxane group of formula $—O—Si(R^2)_3$, wherein each $R^2$ is independently selected from a hydrocarbon radical containing 1 to 20 C atoms;

each Y is independently selected from a hydroxy group or a hydrolysable group selected from the group consisting of a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group; and k is 0, 1 or 2;

b) at least one hydroxyl-functionalized polysiloxane polyalkyleneglycol brush copolymer of the structure $A(-X—B)_s$, wherein A represents said polysiloxane backbone;

B represents said polyalkyleneglycol side chain;

X is a linker group characterized by including the moiety Si—C—C— of which said Si is a part of the polysiloxane backbone A; and s is an integer of from 1 to 100.

2. The curable composition according to claim 1, wherein said hydroxyl-functionalized polysiloxane polyalkyleneglycol brush copolymer has the number average molecular weight (Mn) of from 1000 to 200,000 g/mol.

3. A curable composition, comprising:

a) at least one polymer having at least one silicon-containing group of Formula (A)

$$—Si(R^1)_k(Y)_{3-k} \qquad (A)$$

wherein each $R^1$ is independently selected from a hydrocarbon radical containing 1 to 20 C atoms or a triorganosiloxane group of formula $—O—Si(R^2)_3$, wherein each $R^2$ is independently selected from a hydrocarbon radical containing 1 to 20 C atoms; each Y is independently selected from a hydroxy group or a hydrolysable group selected from the group consisting of a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group;

and k is 0,1 or 2;

b) at least one hydroxyl-functionalized polysiloxane polyalkyleneglycol brush copolymer is represented by Formula (I)

Formula (I)

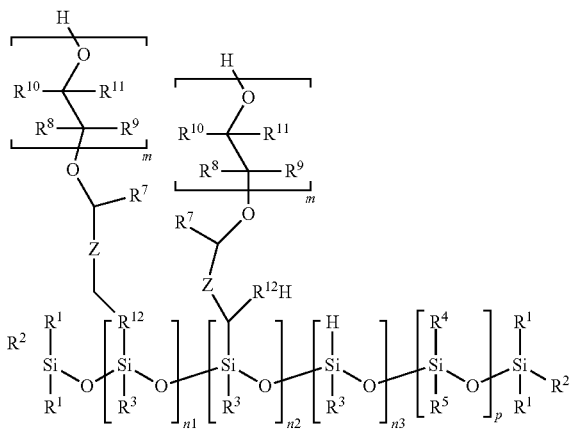

wherein:
- $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, and p;
- $R^8$, $R^9$, $R^{10}$, and $R^{11}$ may be the same or different and in each unit m they are independently selected from hydrogen or a linear, branched or cyclic hydrocarbon residue having 1 to 20 carbon atoms which may contain at least one heteroatom;
- n1 and n2 are an integer independently selected from 0 to 1000, with the proviso that not both of n1 and n2 are 0;
- n3 is an integer from 0 to 1000;
- p is an integer from 0 to 1000; and
- m is an integer from 1 to 1500; wherein at least one of the following is true: $R^7$ in the n1 moiety is a linear, branched or cyclic hydrocarbon residue having 1 to 20 carbon atoms which may contain at least one heteroatom; or at least one of $R^8$, $R^9$, $R^{10}$, and $R^{11}$ in the n1 moiety is a linear, branched or cyclic hydrocarbon residue having 1 to 20 carbon atoms which may contain at least one heteroatom; or n2 is an integer from 1 to 1000; or n3 is an integer from 1 to 1000; or when n1 is 1 or greater, than $R^{12}$ and Z in the n1 moiety comprise a total of at least 3 carbon atoms;

wherein in Formula (1):
- Z is selected from a $C_1$-$C_{20}$ alkylene group, a $C_6$-$C_{18}$ arylene group or a $C_6$-$C_{18}$ aralkylene group, which may contain at least one heteroatom; and
- $R^7$ is selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom; and
- $R^{12}$ is $CR^a_2$ where each $R^a$ may be the same or different and is independently selected from hydrogen, a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

4. The curable composition according to claim 3, wherein in Formula (I):
$R^7$ is selected from a $C_1$-$C_8$ alkyl group.

5. The curable composition according to claim 3, wherein in Formula (I) each of $R^1$, $R^2$, $R^3$, $R^4$ and $R^5$ are independently selected from a $C_1$-$C_{12}$ alkyl group, a $C_3$-$C_{10}$ cycloalkyl group, a $C_6$-$C_{18}$ aryl group or a $C_6$-$C_{18}$ aralkyl group, which may contain at least one heteroatom.

6. The curable composition according to claim 3, wherein in Formula (I) each of $R^1$, $R^2$, $R^3$, $R^4$ and $R^5$ are independently selected from a $C_1$-$C_8$ alkyl group or a $C_6$-$C_{18}$ aryl group, either of which may contain at least one heteroatom.

7. The curable composition according to claim 3, wherein in Formula (I)
$R^8$, $R^9$ and $R^{11}$ are hydrogen; and
$R^{10}$ is a phenyl group.

8. The curable composition according to claim 1, wherein the hydroxyl-functionalized polysiloxane polyalkyleneglycol brush copolymer is obtained by a method comprising the steps of:
a) reacting a hydroxyalkyl allyl ether having a secondary alcohol group with a polyhydridosiloxane under anhydrous conditions and under catalysis of a transition metal catalyst of which the transition metal is selected from Groups 8 to 10 of the Periodic Table to provide a hydroxyl-functionalized polysiloxane prepolymer having Formula (II), Formula (II)

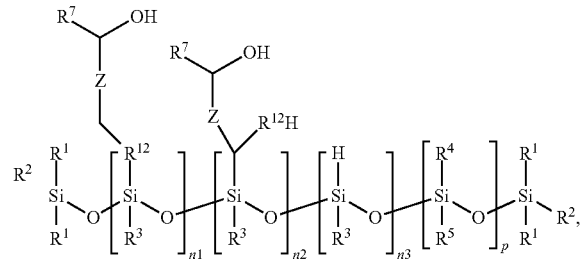

wherein:
- Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
- $R^1$, $R^2$, $R^3$, $R^4$ and $R^5$ may be the same or different and are independently selected from a linear, branched or cyclic hydrocarbon residue having 1 to 20 carbon atoms which may contain at least one heteroatom;
- $R^{12}$ is selected from a linear, branched or cyclic hydrocarbon residue having 1 to 20 carbon atoms which may contain at least one heteroatom;
- $R^7$ is selected from hydrogen or a linear, branched or cyclic hydrocarbon residue having 1 to 20 carbon atoms which may contain at least one heteroatom;
- n1 and n2 is an integer independently selected from 0 to 1000, with the proviso that not both of n1 and n2 are 0;
- n3 is an integer from 0 to 1000; and
- p is an integer from 0 to 1000, said hydroxyalkyl allyl ether conforming to Formula (IV), and Formula (IV)

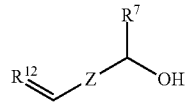

wherein Z, $R^{12}$ and $R^7$ are as defined above,
said polyhydridosiloxane conforming to Formula (V)

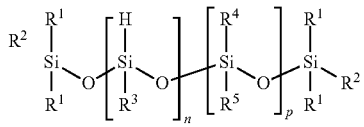

Formula (V)

wherein:
$R^1$, $R^2$, $R^3$, $R^4$, $R^5$ and p are as defined above; and
n is n1+n2+n3,
b) in the presence of the obtained hydroxyl-functionalized polysiloxane prepolymer of Formula (II) and a catalyst, performing a ring-opening polymerization of at least one alkylene oxide monomer having Formula (III):
c)

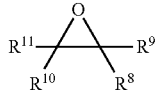

Formula (III)

wherein:
each $R^8$, $R^9$, $R^{10}$ and $R^{11}$ may be the same or different and are independently selected from hydrogen or a linear, branched or cyclic hydrocarbon residue having 1 to 20 carbon atoms which may contain at least one heteroatom.

9. The curable composition according to claim 1, wherein the hydroxyl-functionalized polysiloxane polyalkylenegly-col brush copolymer is obtained by a method comprising the step of reacting a hydroxyalkyl allyl ether having a primary, secondary or tertiary alcohol group of Formula (VI) with a polyhydridosiloxane of Formula (V) under anhydrous conditions and under catalysis of a transition metal catalyst of which the transition metal is selected from Groups 8 to 10 of the Periodic Table,

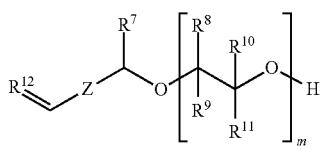

Formula (VI)

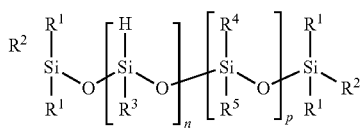

Formula (V)

wherein:
$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom;
$R^7$ is selected from hydrogen or a linear, branched or cyclic hydrocarbon residue having 1 to 20 carbon atoms which may contain at least one heteroatom;
each of $R^8$, $R^9$, $R^{10}$ and $R^{11}$ may be the same or different and are independently selected from hydrogen or a linear, branched or cyclic hydrocarbon residue having 1 to 20 carbon atoms which may contain at least one heteroatom;
$R^{12}$ is selected from a linear, branched or cyclic hydrocarbon residue having 1 to 20 carbon atoms which may contain at least one heteroatom;
Z is a covalent bond or selected from a polyoxyalkylene having a molecular weight of less than 10000 g/mol or a linear, branched or cyclic hydrocarbon residue having 1 to 20 carbon atoms which may contain at least one heteroatom;
m is an integer from 1 to 1500;
n1 and n2 is an integer independently selected from 0 to 1000, with the proviso that not both of n1 and n2 are 0;
n3 is an integer from 0 to 1000; n is n1+n2+n3; and
p is an integer from 0 to 1000.

10. The curable composition according to claim 1, wherein the composition further comprises as compound c) an aminosilane.

11. The curable composition according to claim 1, wherein the composition further comprises as compound c) an aminosilane selected from the group consisting of bis(trimethylsilyl)amine, aminopropyltriethoxysilane, aminopropyltrimethoxysilane, bis[(3-triethoxysilyl)propyl]amine, bis[(3-trimethoxysilyl)propyl]amine, aminopropylmethyldiethoxysilane, aminoethylaminopropyltrimethoxysilane, aminoethylaminopropyltriethoxysilane, 3-[2-(2-aminoethylamino)ethylamino]propyltrimethoxysilane, phenylaminomethyltrimethoxysilane, aminoethylaminopropylmethyldimethoxysilane, 3(N-phenylamino)propyltrimethoxysilane, 3-piperazinylpropylmethyldimethoxysilane, 3(N,N-dimethylaminopropyl)aminopropylmethyldimethoxysilane, and combinations of two or more of the above-mentioned compounds.

12. The curable composition according to claim 1, wherein the curable composition additionally contains at least one compound selected from plasticizers, stabilizers, fillers, reactive diluents, drying agents, adhesion promoters, UV stabilizers, rheological aids, solvents, and mixtures thereof.

13. An adhesive, sealant, or coating material comprising the curable composition according to claim 1.

14. The curable composition according to claim 1, wherein each Y is selected from the group consisting of an alkoxy group, an oxime group, an acetoxy group and a lactate group.

15. The curable composition according to claim 3, wherein in formula I, n2 is an integer from 1 to 1000.

16. A curable composition, comprising:
a) at least one polymer having at least one silicon-containing group of Formula (A)

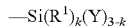   (A)

wherein each $R^1$ is independently selected from a hydrocarbon radical containing 1 to 20 C atoms or a triorganosiloxane group of formula —O—Si$(R^2)_3$, wherein each $R^2$ is independently selected from a hydrocarbon radical containing 1 to 20 C atoms; each Y is independently selected from a hydroxy group or a hydrolysable group selected from the group consisting of a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group;
and k is 0, 1 or 2;

b) at least one hydroxyl-functionalized polysiloxane polyalkyleneglycol brush copolymer is represented by Formula (I)

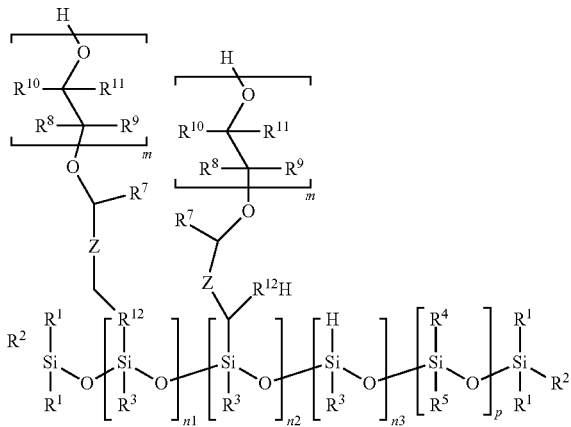

Formula (I)

Z is a $C_{1-8}$ alkylene group which contains O;

$R^1$, $R^2$, $R^3$, $R^4$ and $R^5$ may be the same or different and are independently selected from a linear, branched or cyclic hydrocarbon residue having 1 to 20 carbon atoms which may contain at least one heteroatom, wherein $R^3$, $R^4$ and $R^5$ may be independently selected in each unit n1, n2, n3, and p;

$R^{12}$ is selected from a linear, branched or cyclic hydrocarbon residue having 1 to 20 carbon atoms which may contain at least one heteroatom;

$R^7$ is selected from a linear, branched or cyclic hydrocarbon residue having 1 to 20 carbon atoms which may contain at least one heteroatom;

$R^8$, $R^9$, $R^{10}$, and $R^{11}$ may be the same or different and in each unit m they are independently selected from hydrogen or a linear, branched or cyclic hydrocarbon residue having 1 to 20 carbon atoms which may contain at least one heteroatom;

n1 and n2 are an integer independently selected from 0 to 1000, with the proviso that not both of n1 and n2 are 0;

n3 is an integer from 0 to 1000;

p is an integer from 0 to 1000; and m is an integer from 1 to 1500; wherein at least one of the following is true: $R^7$ in the n1 moiety is a linear, branched or cyclic hydrocarbon residue having 1 to 20 carbon atoms which may contain at least one heteroatom:

or at least one of $R^8$, $R^9$, $R^{10}$, and $R^{11}$ in the n1 moiety is a linear, branched or cyclic hydrocarbon residue having 1 to 20 carbon atoms which may contain at least one heteroatom; or n2 is an integer from 1 to 1000; or n3 is an integer from 1 to 1000.

17. The curable composition according to claim 3, wherein in formula I when n1 is 1 or greater than $R^{12}$ and Z comprise a total of at least 3 carbon atoms.

18. The curable composition according to claim 16, wherein in formula I when n1 is 1 or greater than $R^{12}$ and Z comprise a total of at least 3 carbon atoms.

\* \* \* \* \*